United States Patent [19]  [11] Patent Number: 4,933,189
Cherukuri et al.  [45] Date of Patent: Jun. 12, 1990

[54] CHEWING GUM HAVING LONGER LASTING SWEETNESS

[75] Inventors: Subraman R. Cherukuri, Towaco; Steven M. Faust, Stanhope, both of N.J.; Gul Mansukhani, Staten Island, N.Y.

[73] Assignee: Warner-Lambert Company, Morris Plains, N.J.

[21] Appl. No.: 291,704

[22] Filed: Dec. 29, 1988

[51] Int. Cl.$^5$ .............................................. A23G 00/00
[52] U.S. Cl. .............................................. 426/3; 426/5; 426/548; 426/658; 426/804
[58] Field of Search .............................. 426/3–6, 426/548, 658, 804

[56] References Cited

U.S. PATENT DOCUMENTS

| | | | |
|---|---|---|---|
| 4,148,872 | 4/1979 | Wagenknecht et al. | 426/3 |
| 4,161,517 | 7/1979 | Wagenknecht et al. | 426/3 |
| 4,419,346 | 12/1983 | Stroz et al. | 426/3 |
| 4,490,395 | 12/1984 | Cherukuri et al. | 426/6 |
| 4,711,784 | 12/1987 | Yang | 426/5 |

*Primary Examiner*—Jeanette Hunter
*Attorney, Agent, or Firm*—Charles A. Gaglia, Jr.; Daniel A. Scola, Jr.; Craig M. Bell

[57] ABSTRACT

Chewing gum compositions having longer lasting sweetness including a soft PVA gum base in an amount between about 50% and about 80% by weight of the composition, a flavoring agent, an intense sweetener in an amount between about 0.30% and about 0.60% by weight of the composition, and a bulk sweetener in an amount between about 10% and about 40% by weight of the composition.

9 Claims, No Drawings

CHEWING GUM HAVING LONGER LASTING SWEETNESS

BACKGROUND OF THE INVENTION

This invention relates to chewing gum compositions having longer lasting sweetness and more particularly to chewing gum compositions incorporating a major amount of gum base in amounts sufficient to achieve a reduction in quantities of bulk sweetener without a reduction in sweetness duration.

The sugar alcohols non-cariogenic bulk sweetening agents do not provide increased sweetness over sugar. Certain sugar alcohols, such as sorbitol and mannitol, provide less sweetness per gram than sucrose. Chewing gum compositions relying solely upon such sugar alcohols for sweetness have less sweetness than a chewing gum composition sweetened with an equivalent amount of sucrose Relied upon primarily for the non-cariogenic effect, sugar alcohols possess an undesirable laxating effect. For this reason, the reduction of sugar alcohol bulk sweeteners in chewing gum compositions is also desirable.

One alternative to bulking agents in chewing gum compositions is gum base. A chewing gum composition high in gum base content may also thus be reduced in bulk sweetener. From the disclosure of Bahosky, U.S. Pat. No. 3,943,285 (hereafter the '285 patent) longer lasting sweetness would not be expected from a chewing gum composition in which quantities of bulk sweetener had been replaced by gum base. This reference teaches that to obtain longer lasting sweetness, a major amount of bulk sweetener must be used in combination with an intense sweetener, and that longer lasting sweetness cannot be obtained in compositions having less than 50% bulk sweetener, even when intense sweeteners are used in amounts up to 1.5%.

In addition to imparting sweetness, and as taught by the '285 patent, longer lasting sweetness when combined with an artificial sweetener, the soluble sugar and sugar alcohol bulking agents also impart a discontinuity to the gum base which results in a softer, more pleasant chew and mouth feel. For this reason, such bulking agents cannot be entirely eliminated from a reduced calorie chewing gum composition.

Previous attempts to produce high gum base content chewing gum compositions have resulted in products with a hard, tight rubbery chew and poor texture without longer lasting sweetness. It has now been discovered that longer lasting sweetness can be obtained in a chewing gum composition comprising a major amount of gum base, artificial intense sweetener in quantities higher than previously known in the art and bulk sweetener in quantities lower than previously known in the art. Because the gum base is more than half of the total weight of the composition, the bulk sweetener implicitly is less than half of the composition.

Perfetti et al., U.S. Pat. No. 4,698,223 disclose a non-cariogenic chewing gum composition comprising 92% to 99% by weight of the gum base, up to 4% of glycerol, up to 3% of flavorings, and no-bulk sweetener.

Klose et al., U.S. Pat. No. 4,382,963 disclose a sugar-free chewing gum utilizing spray-dried polydextrose as the bulking agent. From 65% to 85% by weight polydextrose is incorporated into gum base to form a sugar-free unsweetened chewing gum.

U.S. Pat. Nos. 4,252,830 and 4,357,354 issued to Kehoe et al. disclose a chewable chewing gum base which includes gum base containing high levels of inert fillers, such as calcium carbonate or talc in amounts of about 50% to about 85% and about 40% to about 95% by weight respectively. The chewable gum base includes at least 10% air voids entrapped in the gum base matrix which, upon chewing, becomes filled with moisture causing asserted increase in bolus volume.

In U.S. Pat. No. 4,241,091, Stroz et al., disclose a non-cariogenic, non-adhesive chewing gum consisting essentially of gum base, a substantially calorie-free sweetener, from 1% to 15% by weight alphacellulose and from 1% to about 40% by weight water. The chewing gum of Stroz et al., has a high bolus volume.

The prior art references, while effective to make reduced bulk sweetener chewing gums, result in chewing gum formulations having a hard chew or off taste or poor texture because of the use of high levels of fillers and texturizing agents. The references indicate that the use of high levels of fillers and texturizers are essential to obtain a soft chew product. There is no indication that it is possible to obtain longer lasting sweetness for a chewing gum composition sweetened with increased levels of intense sweetener when the bulk sweetener level is reduced. It would therefore be desirable to develop a chewing gum having longer lasting sweetness with a reduced bulk sweetener content without the use of high filler or texturizing agent content.

SUMMARY OF THE INVENTION

It has been found in accordance with the invention that chewing gum compositions having longer lasting sweetness and a reduced bulk sweetener content may be prepared from compositions prepared from soft PVA gum base, in an amount between about 50% and about 80% by weight of the composition, flavoring agent, a bulk sweetening agent in an amount between about 10% and about 40% by weight of the composition and an intense sweetener in an amount between about 0.01% and about 0.60% by weight of the composition. The compositions may be prepared by admixing melted soft PVA gum base with a ⅔ TO ¾ of the bulk sweetening agent until a uniform mixture is formed, adding to the mixture optional fillers and colorants and mixing until uniform, adding the remaining bulk sweetening agent, and artificial or natural intense sweetener, slowly adding the flavoring agent and blending the mixture until a full uniform homogeneous composition is obtained.

DETAILED DESCRIPTION OF THE PREFERRED EMBODIMENT

The chewing gum composition having longer lasting sweetness can be prepared in sugar or sugarless chewing gum combinations which can be made into a variety of products, e.g., stick, slab, chunk, balls, ropes, tablets, and/or center-filled gum products.

The present invention provides a chewing gum which is initially soft and chewable and has a desirable longer lasting sweetness level, yet has a reduced level of bulk sweetener. The use of a major amount of gum base in combination with an amount of bulk sweetening agent sufficient to provide discontinuity to the gum base results in unique chewing gum compositions having desirable chew, taste and texture and improved sweetness duration. While the invention is not to be limited to theoretical considerations, it is believed that longer lasting sweetness results because the higher amounts of soft PVA gum base serve to retain and more slowly release the quantities of bulk sweetening agent and intense sweetener present compared to compositions having lower amounts of the same or different gum bases. And, as stated above, it is the ability to use high gum base concentrations that results in the reduction in bulk sweetener. This use of an intense sweetener that is retained by the gum base along with the bulk sweetener results in unique chewing gum compositions unexpectedly possessing longer lasting sweetness despite having less than 50% bulk sweetener.

The chewing gum compositions of the instant invention contain a soft PVA gum base. The amount of soft PVA gum base employed will vary greatly depending on various factors such as the intended bulk sweetener content of the final product, the type of base used and other components used to make the final product. In general, gum base amounts of about 50% to about 95% by weight of the final chewing gum composition are acceptable for use in the chewing gum compositions of the preferred invention with preferred amounts of about 55% to about 85% and most preferred amounts from about 60% to about 70% by weight.

Soft PVA gum bases are defined as providing a hydrophilic chew character to the chewing gum, which, when formulated into a chewing gum, results in a composition that absorbs moisture to swell and soften in the mouth. This results in a pleasant moist chew.

The gum base used in this invention may be any water insoluble gum base having polyvinyl acetate (PVA) as an essential ingredient together with a natural or synthetic elastomer or mixtures thereof. Such gum bases are known in the art and are not the subject of this invention. An example of such a soft PVA containing gum base is found in U.S. Pat. No. 4,490,395. Illustrative examples of natural elastomers in gum bases include, without limitation, substances of vegetable origin such as chicle, jelutong, gutta percha and crown gum. Examples of synthetic elastomers include, without limitation, isobutylene-isoprene copolymers, styrenebutadiene copolymers, polyethylene, polyisobutylene and mixtures thereof.

The gum base composition contains elastomer solvents to aid in softening the polymer components. Such elastomer solvents comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, and partially hydrogenated wood rosin and partially hydrogenated methyl ester of wood rosin; terpene resins including polyterpine and polymers of alpha-pinene or beta-pinene and mixtures thereof. The elastomer solvents may be employed in amounts ranging from about 2% to about 55% and preferably from about 4% to about 18% by weight of the gum base. Amounts below about 2% cause the chew characteristic to be hard and result in inconsistent flavor release. Amounts above 55% cause a soft product to form which destroys the chew characteristic.

Vinyl polymers, and in particular polyvinyl acetate (PVA) are an essential ingredient. The preferred PVA has a molecular weight of at least 2,000. Such materials are commercially available in various molecular weights which can be successfully used. The polyvinyl acetate is employed in amounts of about 5% to about 45% by weight and preferably about 7% to about 35% by weight. These materials when used in such high amounts aid in extending the elastomer mixture while maintaining product integrity and also provide a hydrophilic soft chew. Amounts below about 5% cause the base to be unstable. Amounts above 45% cause segregation of gum constituents to occur.

It is essential to employ glyceryl monostearate as an emulsifier. When absent the formulation has poor stability and lacks acceptable texture. It is believed that the glyceryl monostearate aids in bringing the normally immiscible constituents together in such a way that they form a single finely dispersed stable system. This emulsifier also simplifies the incorporation of flavors into the final base and aids in retaining finely divided solvents within the gum base complex. The glyceryl monostearate is employed in amounts of about 1% to about 15% and preferably about 3% to about 9%. Additional emulsifiers may also be included, notably lecithin, fatty acid and monoglycerides, diglycerides and triglycerides, propylene glycol monostearate and mixtures thereof. Such materials may be used in the amount of about 1% to about 25% by weight.

The gum base formulation must employ wax material. The waxes have been found to soften the polymer elastomer mixture and improve elasticity of the chew character. The waxes employed are preferably microcrystalline wax, paraffin wax and combinations thereof. Useful amounts are from about 2% to about 25% by weight and preferably from about 2.5% to about 20% by weight of the gum base composition. Preferably these waxes are used in combination in amounts of about 5% to about 20% microcrystalline wax and about 3% to about 15% paraffin wax.

A variety of additional ingredients such as plasticizers or softeners may optionally be added. These materials are optional and not essential in the present formulation. Such materials include hydrogenated vegetable oils, lanolin, stearic acid, sodium stearate, potassium stearate, glyceryl triacetate, acetylated monoglycerides, glycerin and the like and mixtures thereof. Such materials when incorporated into the gum base obtain a variety of desirable texture and consistency properties. These individual materials are generally employed in amounts of up to about 30%, preferably about 1% to about 25% by weight and most preferably in amounts of from about 1.5% to about 12% by weight of the gum base composition. Because of the low molecular weight of these compounds, they are able to penetrate the fundamental structure of the base making it plastic and less viscous.

The bulk sweetening agent may be selected from a wide range of water-soluble agents. Without being limited to particular sweeteners, representative illustrations encompass monosaccharides, disaccharides, and polysaccharides such as xylose, ribose, glucose, mannose, galactose, fructose, dextrose, polydextrose, cellulose, sucrose, maltose, partially hydrolyzed starch or corn syrup solids, palatinit and sugar alcohols such as sorbitol, xylitol, mannitol, maltitol and mixtures thereof.

In general, the amount of bulk sweetener may vary with the desired amount of sweetness selected for a particular chewing gum composition and should be a quantity adequate to provide sufficient discontinuity to the gum base. This amount will normally be less than about 50% by weight when using an easily extractable sweetener. The water-soluble bulk sweeteners described above are preferably used in amounts of at least 5% to about 35% by weight, and most preferably from about 10% to about 25% by weight of the final chewing gum composition.

The artificial intense sweetener may be selected from water-soluble artificial sweeteners and dipeptide based sweeteners, including mixtures thereof. Without being limited to particular sweeteners, representative illustrations encompass the soluble saccharine salts, i.e., sodium or calcium saccharine salts, the free acid form of saccharin, cyclamate salts, acesulfame-K and the like, dipeptide sweeteners such as L-aspartyl-L-phenylalanine methyl ester and materials described in U.S. Pat. No. 3,192,131 and the like, and chlorosucrose compounds.

The addition of intense sweetener in an amount greater than 0.30% by weight is necessary to provide longer lasting sweetness to the chewing gum composition. Amounts of up to about 5.0% by weight are acceptable, and amounts up to about 2.5% by weight are preferred. Amounts up to about 1.00% by weight are more preferred, and most preferably between about 0.30% to about 0.60% by weight of intense sweetener will be used. This quantity of intense sweetener in combination with less than 50% bulk sweetener unexpectedly provides a chewing gum composition having longer lasting sweetness. The sweetener is administered in either the free form, the encapsulated form or in mixtures thereof to provide a consistent delivery of longer lasting sweetness. Some or all of the flavoring agent may also be encapsulated to prolong flavor duration, alone, or in combination with the sweetener. L-aspartyl-L-phenyl-alanine methyl ester is a preferred intense sweetener.

Encapsulated delivery systems for flavoring agents or sweetening agents comprise a hydrophobic matrix of fat or wax surrounding a sweetener or flavoring component. The fats may be selected from any number of conventional materials such as fatty acids, glycerides, polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil sand mixtures thereof. Other fatty acid oils are contemplated. Glycerides which are useful include mono-, di- and triglycerides.

Waxes useful are chosen from among the group consisting of natural or synthetic waxes and mixtures thereof. Non-limiting examples include paraffin wax, petrolatum, carbowax, microcystalline wax, beeswax, carnuba wax, candellila wax, lanolin, bayberry wax, sugarcane, spermaceti wax, rice bran wax and combinations thereof.

The fats and waxes may be used individually or in combination in amounts varying from about 10 to about 70% by weight of the delivery system, and preferably in amounts of about 40 to about 58% by weight. When used in a combination, the fat and wax are preferably present in a ration of about 70:10 to about 85:15 of fat to wax.

Typical encapsulated flavor or sweetener delivery systems are disclosed in U.S. Pat. No. 4,597,970 and U.S. Pat. No. 4,722,845

The chewing gum composition of this invention may additionally include the conventional additives of coloring agents such as titanium dioxide; emulsifiers such as lecithin and glycerol monostearate; and fillers such as dicalcium phosphate, aluminum hydroxide, alumina, aluminum silicates, talc, calcium carbonate and combinations thereof. The total amount of fillers present is generally up to about 10% by weight. The colorants useful in the present invention include the pigments that may be incorporated in amounts of up to about 6% by weight and preferably up to about 1% by weight. A preferred pigment is titanium dioxide, also the colorants may include other dyes suitable for food, drug and cosmetic applications, and known as the FD&C dyes and the like. The materials acceptable for the foregoing spectrum of use are preferably water soluble. Illustrative examples include the indigo dye, known as FD&C Blue No. 2, which is the disodium salt of the 5,5-indigotindisulfonic acid. Similarly, the dye known as FD&C Green No. 1, comprises a triphenylmethane dye and is the monosodium salt of 4-[4-N-ethyl-p-(sulfobenzylamino)diphenylmethylene]-[1-(N-ethyl-p-sulfoniumbenzyl)-2,5-cyclohexadienimine]. A full recitation of all FD&C and D&C colorants and their corresponding chemical structures may be found in the Kirk-Othmer Encyclopedia of Chemical Technology, Third Edition, in Volume 6 at pages 561–595, which text is accordingly incorporated herein by reference.

Flavoring agents well known to the chewing gum art may be added to the chewing gum composition of the instant invention. These flavoring agents may be chosen from synthetic flavor oils and/or oils derived from plants, leaves, flowers, fruits and so forth, and combinations thereof. Representative flavor oils include: spearmint oil, cinnamon oil, oil of wintergreen (methylsalicylate) and peppermint oils. Also useful are artificial, common, natural or synthetic fruit flavors such as citrus oil, including lemon, orange, grape, lime and grapefruit, and fruit essences including apple, strawberry, cherry, pineapple and so forth. The flavoring agent may be a liquid, spray-dried encapsulated, sorbed on a carrier and mixtures thereof.

The amount of flavoring agent employed is normally a matter of preference subject to such factors as flavor type, base type and strength desired. In general, amounts of about 0.05% to about 5.0% by weight of the final chewing gum composition are usable for amounts of about 0.3% to about 4.5% by weight of the final chewing gum composition are usable with amounts of about 0.3% to about 4.5% being preferred and about 0.7% to about 3.5% being most preferred.

A method for forming the chewing gum of the invention includes melting the gum base and mixing the gum base in a kettle with a portion of the bulk sweetening agent until a uniform mixture is formed. The balance of the sweetening agent, flavor, artificial intense sweetener and other conventional ingredients, if any, are added next with continued mixing until a homogeneous mass is formed. The product is recovered from the kettle and shaped to form stick, slab, chunk, balls, ropes, shredded, tablet and/or center-filled gum products.

An illustrative process involves first melting the gum base at a temperature from about 70° C. to about 120° C. and mixing the gum base in the kettle with ⅔ or ¾ of the sweetening ingredients for 2–8 minutes. To this mixture optional fillers or colorants are added and mixing is continued for 1–4 minutes. The remaining sweetening ingredients are added and while mixing is continued, the flavoring agent is added slowly. The mixing is continued until a homogeneous mass is formed. The gum is discharged from the kettle and formed into its desired shapes such as sticks, slabs, chunks, balls, ropes, shredded, tablets and/or center-filled.

The following examples serve to provide further appreciation of the invention but are not meant in any way to restrict the effective scope of the invention. All percentages throughout the specification are by weight % of the final composition unless otherwise indicated.

EXAMPLES

Examples 1 and 2

An experimental sample of a reduced bulk sweetener chewing gum composition is prepared together with a hard chewing gum base control sample, typical of a conventional formula in production, according to the following formulations listed in Table 1.

TABLE 1

| Ingredient | Percent (w/w) | |
| --- | --- | --- |
| Example | 1 | 2 |
| Hard Gum Base | 28.00 | — |
| Soft PVA Gum Base | — | 65.00 |
| Sorbitol | 34.80 | 22.98 |
| Mannitol | 13.85 | 4.26 |
| Xylifin | 10.00 | — |
| Free Aspartame | — | 0.35 |
| Encapsulated Aspartame | 2.10 | 0.61 |
| (Total Aspartame) | (0.35%) | (0.45%) |
| Liquid Peppermint | 1.35 | 1.90 |
| Spray-Dried Peppermint | — | 0.50 |
| Menthol | — | 0.20 |
| Lecithin | 0.40 | 0.20 |
| Glycerin | 9.00 | 4.00 |
| Gelatin | 0.30 | — |
| Water | 0.20 | — |

The organoleptic properties of the two samples were evaluated by both consumer and expert panels. The sweetness and flavor intensity and duration of the two samples were among the properties evaluated. The expert panel determined that the experimental sample had longer lasting sweetness and flavor than the control. As previously stated, while the invention is not to be limited to theoretical considerations, it is believed that longer sweetness and flavor result because the higher amounts of soft PVA gum base serve to retain and more slowly release the quantities of bulk sweetening agent, intense sweetener and flavoring agent present compared to compositions having lower amounts of the same or different gum bases.

This invention being thus described, it will be obvious that the same may be varied in many ways. Such variations are not to be regarded as a departure from the spirit and scope of the invention and all such modifications are intended to be included within the scope of the following claims.

We claim:

1. A chewing gum composition having longer lasting sweetness which comprises:

(a) a soft PVA gum base in an amount between about 50% and about 80% by weight of said composition;
 (b) a flavoring agent;
 (c) an intense sweetener in an amount between about 0.30% and about 0.60% by weight of said composition; and
 (d) a bulk sweetener in an amount between about 10% and about 40% by weight, of said composition.

2. The composition of claim 1, wherein the gum base comprises PVA and a natural or synthetic elastomer selected from the group consisting of chicle, jelutong, gutta percha, crown gum, isobutylene-isoprene copolymer, styrene-butadiene copolymer, polyethylene, polyisobutylene and mixtures thereof.

3. The composition of claim 1, wherein said gum base is present in an amount between about 50% and about 70% by weight of said composition.

4. The composition of claim 1, wherein said bulk sweetener is selected from the group consisting of xylose, ribose, glucose, mannose, galactose, fructose, dextrose, polydextrose, cellulose, sucrose, maltose, partially hydrolyzed starch or corn syrup solids, palatint, sorbitol, xylitol, mannitol, maltitol and mixtures thereof.

5. The composition of claim 1, wherein said bulk sweetener is present in an amount between about 10% and about 25% by weight of said composition.

6. The composition of claim 1, wherein said intense sweetener is selected from the group consisting of sodium or calcium saccharine salts, the free-acid form of saccharin, cyclamate salts, chlorosucrose derivatives, dipeptide compounds, and acesulfame-K.

7. The composition of claim 6, wherein said dipeptide compound is L-aspartyl-L-phenylalanine methyl ester.

8. The composition of claim 6, wherein said artificial intense sweetener is present in an amount between about 0.30% to about 0.45% by weight of said composition.

9. A method of preparing a chewing gum composition comprising a bulk sweetening agent in an amount less than about 50% by weight and a soft PVA chewing gum base present in an amount from about 50% to about 80%, said composition having a longer lasting sweetness, which method comprises:

admixing melted soft PVA chewing gum base with $\frac{2}{3}$ to $\frac{3}{4}$ of said bulk sweetening agent until a uniform mixture is formed;
 admixing optional fillers and colorants until a uniform mixture is formed;
 admixing the remaining bulk sweetening agent and artificial intense sweetener until a uniform mixture is formed;
 slowly admixing flavoring agents;
 mixing until a homogeneous mass is formed; and
 cooling the resulting mix to form a chewing gum and recovering the product.

* * * * *